United States Patent
Brohm (10) Patent No.: US 11,865,971 B2
(45) Date of Patent: Jan. 9, 2024

(54) BACKLIT INTERIOR TRIM PANEL FOR VEHICLE INTERIOR

(71) Applicant: GRUPO ANTOLÍN-INGENIERÍA, S. A., Burgos (ES)

(72) Inventor: Stephan Brohm, Weyhausen (DE)

(73) Assignee: GRUPO ANTOLÍN-INGENIERÍA, S. A., Burgos (ES)

( * ) Notice: Subject to any disclaimer, the term of this patent is extended or adjusted under 35 U.S.C. 154(b) by 0 days.

(21) Appl. No.: 17/911,395

(22) PCT Filed: Mar. 11, 2021

(86) PCT No.: PCT/EP2021/056162
§ 371 (c)(1),
(2) Date: Sep. 13, 2022

(87) PCT Pub. No.: WO2021/180838
PCT Pub. Date: Sep. 16, 2021

(65) Prior Publication Data
US 2023/0098251 A1 Mar. 30, 2023

(30) Foreign Application Priority Data
Mar. 13, 2020 (EP) ..................................... 20382193

(51) Int. Cl.
*B60Q 3/66* (2017.01)
*B60R 13/02* (2006.01)
(Continued)

(52) U.S. Cl.
CPC ................ *B60Q 3/66* (2017.02); *B60R 13/02* (2013.01); *G02B 6/0043* (2013.01);
(Continued)

(58) Field of Classification Search
CPC .... G02B 6/0035; G02B 6/0036; G02B 6/004; G02B 6/0041; G02B 6/0043;
(Continued)

(56) References Cited

U.S. PATENT DOCUMENTS

| | | | | |
|---|---|---|---|---|
| 2008/0252818 A1* | 10/2008 | Wu | ...................... | G02B 6/0078 362/616 |
| 2009/0167990 A1* | 7/2009 | Konno | ................. | G09G 3/3426 349/65 |

(Continued)

FOREIGN PATENT DOCUMENTS

| | | |
|---|---|---|
| EP | 2716965 A1 | 4/2014 |
| EP | 3348900 A1 | 7/2018 |

(Continued)

OTHER PUBLICATIONS

Machine translation of WO 2010110507 A1 retrieved from the FIT database of PE2E search. (Year: 2023).*
Jun. 11, 2021—International Search Report of PCT/EP2021/056162.

*Primary Examiner* — Colin J Cattanach
(74) *Attorney, Agent, or Firm* — Darrell G. Mottley (57) ABSTRACT

Backlit interior trim panel for vehicle interior comprising a decorative cover, a supporting component and a two-dimensional light guide comprising multiple independent lighting areas placed between the decorative cover and the supporting component. The two-dimensional light guide comprises a plurality of portions being optically separated between them in order to obtain said independent lighting areas by an only light guide, and light extracting means particularly configured to emit homogeneous light in such a way that the two-dimensional light guide is capable of emitting light in a controlled way.

13 Claims, 6 Drawing Sheets

(51) Int. Cl.
  *F21V 8/00*     (2006.01)
  *B60Q 3/62*     (2017.01)
  *B60Q 3/64*     (2017.01)

(52) U.S. Cl.
  CPC ......... *G02B 6/0045* (2013.01); *G02B 6/0088* (2013.01); *B60Q 3/62* (2017.02); *B60Q 3/64* (2017.02); *G02B 6/004* (2013.01); *G02B 6/0035* (2013.01); *G02B 6/0036* (2013.01); *G02B 6/0041* (2013.01); *G02B 6/0075* (2013.01); *G02B 6/0078* (2013.01)

(58) Field of Classification Search
  CPC ...... G02B 6/0075; G02B 6/0078; B60Q 3/62; B60Q 3/64; B60Q 3/66

See application file for complete search history.

(56) References Cited

U.S. PATENT DOCUMENTS

| | | | |
|---|---|---|---|
| 2012/0069548 A1* | 3/2012 | Chen | G02B 6/0078 362/97.1 |
| 2013/0329458 A1* | 12/2013 | Huang | G02B 6/0078 29/527.1 |
| 2014/0003076 A1 | 1/2014 | Suganumata et al. | |
| 2014/0210190 A1 | 7/2014 | Bosch et al. | |
| 2015/0309240 A1* | 10/2015 | He | G02B 6/0058 362/606 |
| 2018/0031882 A1* | 2/2018 | Ota | G02B 6/0011 |
| 2019/0346111 A1* | 11/2019 | Kürschner | B60Q 1/2607 |

FOREIGN PATENT DOCUMENTS

| | | | |
|---|---|---|---|
| ES | 2422876 A1 | 9/2013 | |
| WO | WO-2010110507 A1 * | 9/2010 | G02B 6/0038 |

* cited by examiner

BACKLIT INTERIOR TRIM PANEL FOR VEHICLE INTERIOR

CROSS-REFERENCE TO RELATED APPLICATION

The present application is a U.S. National Phase of International Application No. PCT/EP2021/056162 filed on Mar. 11, 2021, which claims priority to EP Application No. 20382193.9, filed Mar. 13, 2020. The content of each of the above application is incorporated by reference herein in their entireties.

FIELD OF THE INVENTION

The present invention relates to a backlit interior trim panel for vehicle interior comprising a decorative cover, a supporting component and a two-dimensional light guide comprising multiple independent lighting areas placed between the decorative cover and the supporting component.

Specifically, the two-dimensional light guide comprises a plurality of portions being optically separated between them in order to obtain said independent lighting areas by an only light guide.

BACKGROUND OF THE INVENTION

One of the current trends to increase the comfort of the vehicle occupants inside the vehicle is to add lighting functions to the already existing interior trim panels.

In some cases, it is interesting that the addition of said lighting function is carried out in such a way that the components in charge of said lighting function are hidden when the light source is off. This kind of interior backlit trim panel are commonly called backlit interior trim panels.

In order to backlight an interior trim panel, it is common the use of two-dimensional light guides to transmit and distribute the light normally emitted by punctual light sources such as LEDs.

In order to do this, light guides comprise a light extracting side and a light emission side.

The light extracting side comprises light extracting means in order to couple the light out the light guide via the light emission side.

Depending on the size of the light guide and the amount of light to be emitted, more than one light source can be optically coupled with the light guide.

In any case, the light injected inside the light guide by the light sources optically coupled with the light guide is mixed and distributed inside the light guide and the light emitted is the result of the combination of the different lights injected by every light source.

In order to obtain a light emitting surface comprising lighting areas having different colours at the same time, normally it is necessary to combine different independent light guides which transmit and distribute the light coupled independently of each other.

In order to achieve this effect by using only one light guide, it is known the patent EP2021842. It discloses a two-dimensional light guide having several portions optically separated. According to one of the embodiments of this patent the two-dimensional light guide is divided into two independent light guiding portions optically isolated by a light reflector or blocking region. Each light guiding portion comprises its own light source. In this way the light guide discussed is able to emit light of different colours at the same time.

However according to the configuration disclosed above according the patent EP2021842, the light emitted by the two portions is not able to emit light over the whole surface of each portion without the light emitted by one portion is mixed with the light emitted by the contiguous portion. It is because the two light guide portions are not completely divided by the gap between them, and consequently allowing light transfer between both portions.

Therefore, the light emitted by this light guide when the two light sources simultaneously emit light, even having the same light parameters, is not able to be homogeneous over the whole surface of the light guide as if it was an only light guide.

In view of the disadvantages mentioned above, the object of the invention is a backlit interior trim panel for vehicle interior having a two-dimensional light guide comprising multiple independent lighting areas, wherein the two-dimensional light guide is capable of emitting light in a controlled way.

Such control consists in either, the light emitted by every independent lighting area is not mixed with the light emitted by its contiguous independent lighting area, and the light emitted by every independent lighting area is homogeneous.

According to the above it is possible either, the light guide emits different colours at the same time, or the light guide is capable of acting as an only light guide in which its whole surface is able to emit homogeneous light over its whole surface, that is, an optical separation between contiguous portions is not appreciated.

DESCRIPTION OF THE INVENTION

The present invention is established and characterised by the independent claims, while the dependent claims describe additional features thereof.

The two-dimensional light guide having a plurality of lobed portions wherein said lobed portions are physically connected by its side surfaces and optically separated between them, allows defining multiple independent lighting areas.

Thus, the two-dimensional light guide is capable of emitting light of different colours at the same time being an only light guide.

Due to each lobed portion has a variable thickness in the direction "n" according to a configuration wherein the minimum thickness is at the side surfaces, and the maximum thickness is along a middle line "m", the light emitted by a lobed portion is not mixed with the light emitted by the contiguous lobed portion.

Due to each lobed portion has a light extracting means having a light extracting capacity increasing progressively as they separate from the light source in a direction "l", and having a light extracting capacity decreasing progressively as they separate from the middle line "m" in a direction "n" perpendicular to the direction "l", each lobed portion can define an independent lighting area configured to emit homogenous light from its curved surface and over its whole surface.

On the one hand, the increasing of the light extracting capacity in the direction "l" allows compensating the decreasing of the available light inside the lobed portion as the light extracting means (5) are separated from the light source.

It is because as the light is being extracted outside of the lobed portion, the total amount of available light to be transmitted over the remaining portion of the lobed portion in the direction "l" gradually decreases.

On the other hand, the decreasing of the light extracting capacity as the light extracting means are separated from the middle line "m" in the direction "n" is in order to compensate the increasing of the available light inside the lobed portion as the light extracting means are separated from middle line "m" due to the gradual decreasing of the thickness of the lobed portion in the "n" direction.

Thus, the two-dimensional light guide is able to emit homogenous light over the whole surface of each lobed portion, and particularly it is able to emit at the same time homogenous light of different colours, that is, each lobed portion is able to emit homogeneous light of a particular colour different from the light emitted by a contiguous lobed portion. In this way, multiple independent lighting areas can be achieved.

The particular combination of a two-dimensional light guide having a variable thickness according to the particular configuration discussed above, and having light extracting means according to the particular configuration discussed above, allows that an optical separation between two contiguous lobed portions is not appreciated by the vehicle occupant.

Thus, the two-dimensional light guide is capable of acting as an only light guide in such a way that it can emit homogeneous light over its whole surface without optical separations between contiguous lobed portions when the light coupled to said lobed portions have the same light parameters.

BRIEF DESCRIPTION OF THE DRAWINGS

The present specification is completed by a set of figures that illustrate a preferred embodiment and in no way limit the invention.

DETAILED DESCRIPTION OF THE INVENTION

Figure 1:
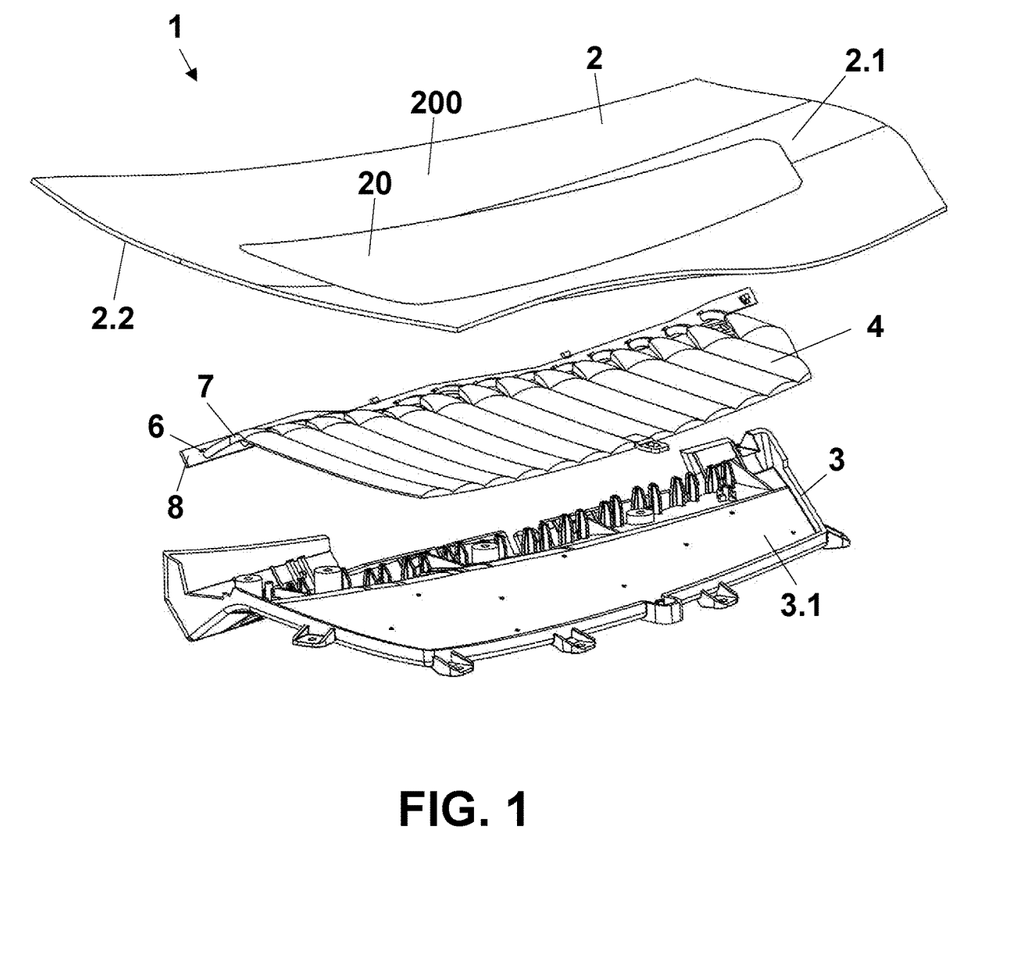
FIG. 1 shows an exploded perspective view of the backlit interior trim panel for vehicle interior of the invention wherein the basic components of the assembly can be appreciated.

FIG. 1 shows an exploded perspective view of the backlit interior trim panel (1) of the invention wherein the main components of the assembly can be appreciated.

The backlit interior trim panel (1) particularly comprises a decorative cover (2), a supporting component (3) and a two-dimensional light guide (4) comprising multiple independent lighting areas (40) and being placed between the decorative cover (2) and the supporting component (3).

The backlit interior trim panel (1) can be any trim placed inside the vehicle interior such as a door trim, a pillar trim, a dashboard trim, central console trim, a floor carpet, a roof trim, or a portion of any of them, that is, the backlit interior trim panel (1) of the present invention can be a backlit trim insert configured to be attached to any of the trims above mentioned.

The decorative cover (2) is configured to hide the components comprising the lighting device, that is, the two-dimensional light guide (4), the light sources (6), the circuit (8), etc. when said light sources (6) are switched off.

Additionally, the decorative cover (2) is configured to position and fix the two-dimensional light guide (4). These functions can be performed by the decorative cover (2) by itself, or they can be performed by the collaboration between the decorative layer (2) and the supporting component (3).

In order to carry out the above cited functions, the decorative layer (2) can comprise centering and connecting means.

The decorative cover (2) has a translucent backlit area (20) configured to allow passing through it the light emitted by the two-dimensional light guide (4). The light emitted in this way is visible in the vehicle interior.

Said translucent backlit area (20) can be configured in a part of the decorative cover (2), as FIG. 1 shows, or can comprise the total surface of said decorative cover (2), according to an embodiment not represented.

In the case in which the translucent backlit area (20) does not extend over the whole surface of the decorative cover (2), as FIG. 1 shows, said decorative cover (2) additionally comprises an opaque area (200).

The decorative cover (2) has a front decorative side (2.1) facing the vehicle interior, and a back side (2.2) opposite to the front decorative side (2.1).

The decorative cover (2) receives the light emitted by the two-dimensional light guide (4) from its back side (2.2) and emits the light received to the vehicle interior by the portion of its front decorative side (2.1) being in correspondence with the translucent backlit area (20).

Preferably, the portion of the decorative cover (2) in correspondence with the translucent backlit area (20) comprises a transparent panel covered by a translucent covering element.

Said transparent panel can comprise a transparent plastic material such as polycarbonate (PC), polymethyl methacrylate (PMMA), polypropylene (PP), or methyl methacrylate-acrylonitrile-butadiene-styrene (MABS).

The translucent covering element which covers the transparent panel in order to provide a pleasant appearance and in order to hide the lighting device can comprise a textile made of natural or synthetic fibers; a synthetic film made of polyvinyl chloride (PVC), thermoplastic polyurethane (TPU), thermoplastic polyolefin (TPO) or a combination of them; a perforated leather; or a translucent veneer made of stone, wood or cork.

Additionally, said covering element can comprise an additional soft layer in order to provide a soft touch to the translucent backlit area (20). This soft layer can be a translucent foam or a three-dimensional knitted fabric.

In the case in which the translucent backlit area (20) also comprises an opaque area (200), said opaque area (200) can comprise a plastic panel covered by a covering element which provides a pleasant appearance and optionally a soft foam layer in order to provide a soft touch.

Preferably the finishing of both, the translucent backlit area (20) and the opaque area (200) are configured to provide a good aesthetic appearance.

In order to configure a particular lighting indicia such as a logo or a text message, the backlit interior trim panel (1) additionally can comprise a mask (not represented) configuring opaque portions and translucent portions according to the particular contour of the indicia.

Said mask can be configured on the decorative cover (2) or any layer forming said decorative cover (2).

Particularly, the mask can be made by a printing process. In this particular case, the printing process can be carried out on any layer forming the decorative cover (2) such as for example, the transparent panel, the translucent covering element, the additional soft foam layer, or on an additional layer configured to perform this function.

Optionally, in the case in which the mask is configured in the decorative layer (2), it can be made by cutting a portion of an additional opaque layer configured to perform this function forming part of the decorative layer (2).

On the other hand, the decorative cover (2) can additionally comprise an electronic circuit (not represented) in order to perform additional functions related to radio frequency identification (RFID) applications, capacitive sensing/switching, antenna integration or heating.

Said electronic circuit can be configured by either, printed conductive material or conductive metallic wires.

The supporting component (3) forming the backlit interior trim panel (1) of the invention, is configured to protect the two-dimensional light guide (4).

Additionally, the supporting component (3) is configured to position and fix the two-dimensional light guide (4). These functions can be performed by the supporting component (3) by itself, or as it has been discussed above, said functions can be performed by the collaboration between the supporting component (3) and the decorative layer (2).

In order to carry out the above cited functions, the supporting component (3) can comprise a plastic rigid part having centering and connecting means.

The supporting component (3) can comprise a front side (3.1) facing the two-dimensional light guide (4) configured to reflect any residual light escaping from the back light extracting surface (4.2) of the two-dimensional light guide (4).

On the other hand, said reflecting function can be carried out by an additional reflecting foil mounted on the front side (3.1) of the supporting component (3).

With the purpose of favoring a light management having a maximum use thereof, preferably there is an air gap between the supporting component (3) and the two-dimensional light guide (4).

The two-dimensional light guide (4) is formed by a plate shaped optical transparent part being able to have a substantially flat main shape or a three-dimensional main shape. This shape depends on the particular shape of the backlit interior trim panel (1). Said two-dimensional light guide (4), as it is shown in FIGS. 2 and 3, comprises a back light extracting surface (4.2), a front light emission surface (4.1), a plurality of the lobed portions (4.3), and at least a light source (6) in correspondence with each of the lobed portions (4.3).

The back light extracting surface (4.2) of the two dimensional light guide (4) faces the front side (3.1) of the supporting component (3).

The front light emission surface (4.1) of the two dimensional light guide (4) faces the back side (2.2) of the decorative cover (2) and it is configured to emit light to it, and particularly to the portion of said decorative cover (2) being in correspondence with the translucent backlit area (20).

Figure 2:
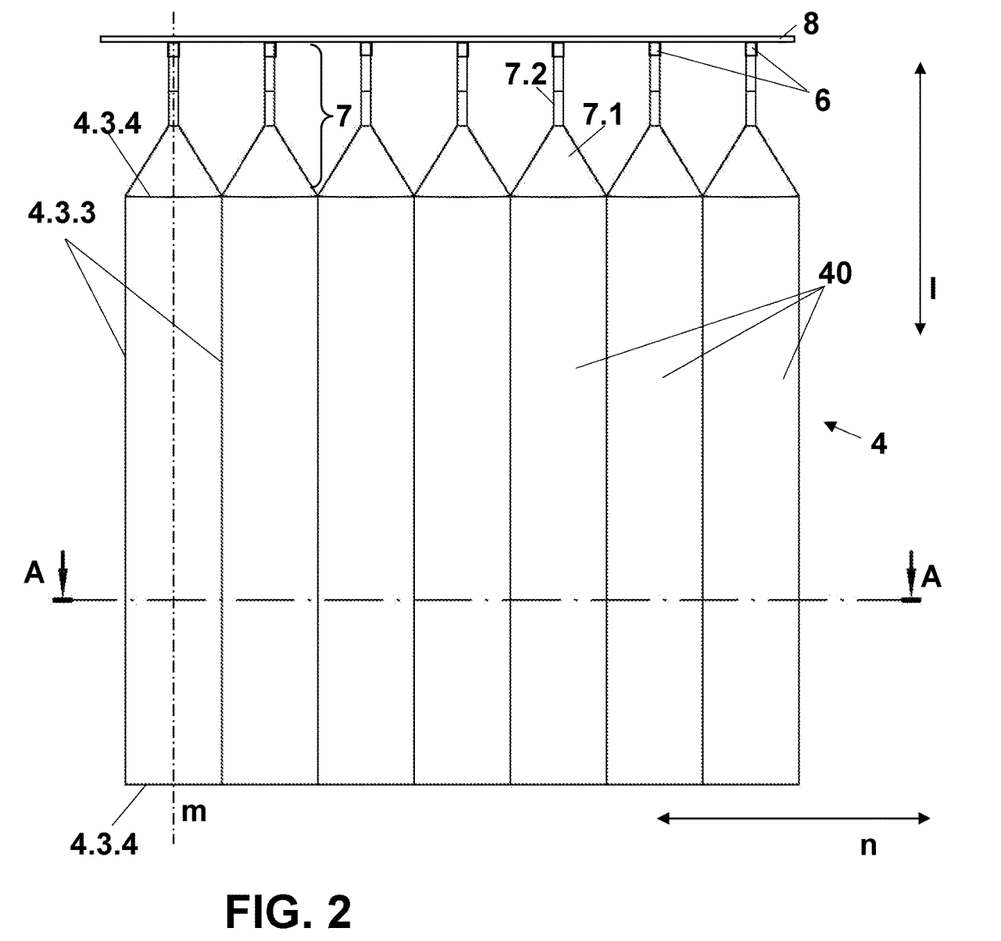
FIG. 2 shows a plan view of the two-dimensional light guide according to a first embodiment of the invention.
Figure 3:
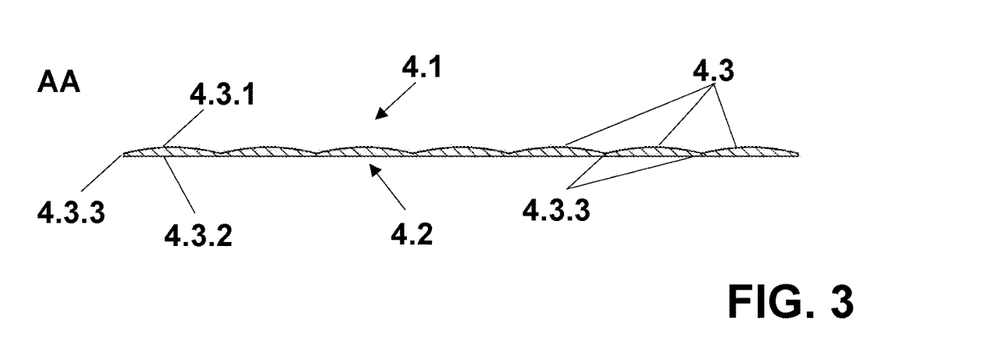
FIG. 3 shows a cross-sectional view along AA as represented in FIG. 2 of the two-dimensional light guide.

Each lobed portion (4.3) extends longitudinally in the direction "l" represented in the FIG. 2. It means that the main longitudinal axis of each lobed portion (4.3) is extended in the direction "l".

Each lobed portion (4.3) comprises a curved surface (4.3.1) in correspondence with the front light emission surface (4.1) of the two-dimensional light guide (4), a flat surface (4.3.2) in correspondence with the back light extracting surface (4.2) of the two-dimensional light guide (4), two side surfaces (4.3.3), and two edges (4.3.4) defined at the ends of each lobed portion (4.3).

Said lobed portions (4.3) can have the same length in the direction "l", or can have different lengths. Likewise, the two-dimensional light guide (4) can be formed by some lobed portions (4.3) having the same length and other lobed portions (4.3) having a different length. It will depend for example on the design of the surface to be illuminated and/or the available space.

Each lobed portion (4.3) can comprise its two side surfaces (4.3.3) being parallel between them, and parallel to the main longitudinal axis of the lobed portion, as for example FIG. 2 shows, or according to an embodiment not represented, said side surfaces (4.3.3) can be non-parallel between them, for example according to a divergent or convergent configuration.

Additionally, the present invention refers to a two-dimensional light guide (4) wherein lobed portions (4.3) having a divergent configuration are alternated with lobed portions (4.3) having a convergent configuration.

The flat surface (4.3.2) of each lobed portion defines a middle line "m" parallel to the direction "l" and being between the both side surfaces (4.3.3) of the lobed portion (4.3).

As it can be seen particularly in the FIG. 3, each lobed portion (4.3) comprises a variable thickness between its flat surface (4.3.2) and its curved surface (4.3.1) in a direction "n" perpendicular to the direction "l".

Figure 6:
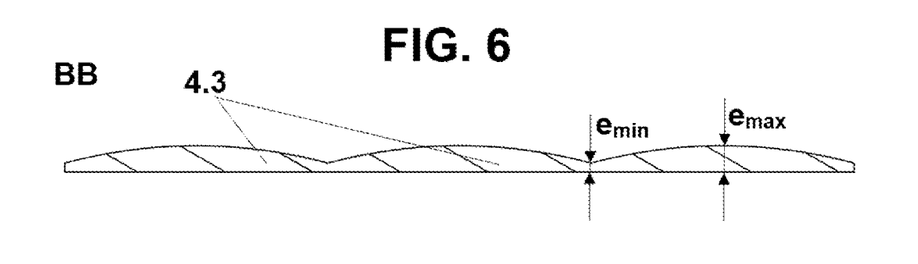
FIG. 6 shows a cross-sectional view along BB as represented in figure.

Particularly, each lobed portion (4.3) has a minimum thickness $e_{min}$ along its side surfaces (4.3.3), and a maximum thickness $e_{max}$ along a middle line "m" as it has been represented in the FIG. 6.

On the one hand, the lobed portions (4.3) are physically connected one another by the side surfaces (4.3.3).

On the other hand, the lobed portions (4.3) are optically separated between them.

It means that the light distributed and transmitted by a particular lobed portion (4.3) does not passes to a contiguous lobed portion (4.3) due to the particular configuration of the side surface (4.3.3) of the lobed portion (4.3) having a thickness less than the thickness of the lobed portion (4.3) along the middle line "m".

Although it is possible that a minimum amount of light pass through the side surface (4.3.3) of the lobed portion (4.3), this amount of light is considered negligible in respect of the whole amount of light transmitted along a particular lobed portion (4.3) in such a way that it is not appreciated by the vehicle occupant when the interior backlit trim panel (1) is backlighted, that is, when the light source (6) is switched on.

For example, when a lobed portion (4.3) emits light having a first colour, and the contiguous lobed portion (4.3) emits light having a second colour, the vehicle occupant cannot appreciate any light having a third colour formed by the mixing of the first colour and the second colour over the part of the backlit interior trim panel (1) being in correspondence with the connection portion between two contiguous lobed portions (4.3).

Figure 4:
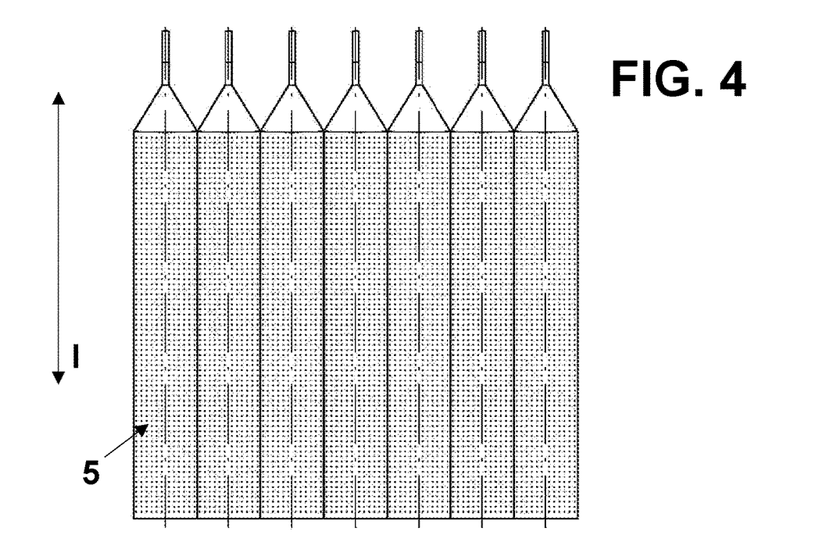
FIG. 4 shows a plan view of the two-dimensional light guide wherein the light extracting means have been represented.

In order to the light emitted by each lobed portion (4.3) is homogeneously emitted by its curved surface (4.3.1) being in correspondence with the front light emission surface (4.1) of the two-dimensional light guide (4) and over its whole surface, the flat side (4.3.2) of the two-dimensional light guide (4) comprises light extracting means (5). These light extracting means (5) are represented in the FIGS. 4 and 5.

Figure 5:
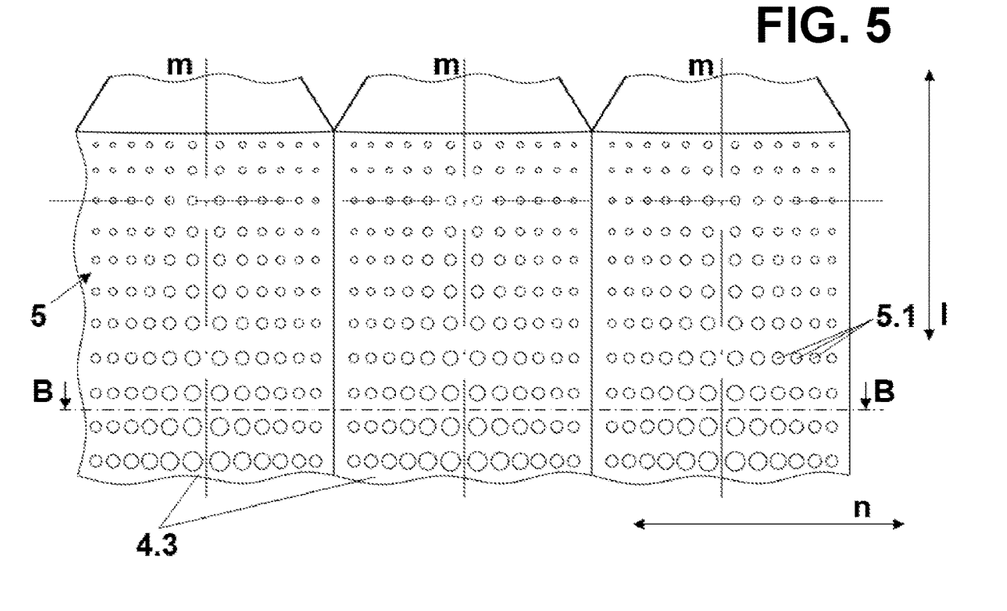
FIG. 5 shows a detail view of the light extracting means represented in the FIG. 4.

As particularly FIG. 5 shows, said light extracting means (5) are particularly configured to have a light extracting capacity increasing progressively as said light extracting means (5) are separated from the light source (6) in the direction "l", and to have a light extracting capacity decreasing progressively as said extracting means (5) are separated from the middle line "m" in the direction "n".

Thus each lobed portion (4.3) defines an independent lighting area (40) configured to emit homogenous light from its curved surface (4.3.1) and over its whole surface in such a way that when two contiguous lobed portions (4.3) emit light having the same lighting parameters from its curved sides (4.3.1) and at the same time, an optical separation between said contiguous lobed portions (4.3) is not appreciated.

As it has been discussed above, it means that the vehicle occupant of the vehicle being inside the vehicle and facing the backlit interior trim (1), he or she cannot appreciate any separation between two contiguous lobed portion (4.3).

As the particular embodiment represented in FIG. 5 shows, the light extracting means (5) can comprise a number of light extracting points (5.1) in order to extract the light out of the lobed portion (4.3). These light extracting points (5.1) can comprise for example protrusions, cavities, scratches or portions of material deposited, for example by serigraphy, on the flat surface (4.3.2) of the lobed portion (4.3).

According to the invention, the light extracting capacity of the light extracting means (5) can be variable due to the density of the light extracting points (5.1) according to an embodiment not represented, or due to the size of said light extracting points (5.1), as FIG. 5 shows.

In the particular case in which the light extracting means (5) vary due to the density of the light extracting points (5.1), the light extracting points (5.1) can be distributed over the flat side (4.3.2) of a lobed portion (4.3) in such a way that the density of said light extracting points (5.1) increases as they separate from the light source (6) in the direction "l", that is, increasing the light extracting capacity, and in such a way that the density of said light extracting points (5.1) decreases as they separate from the middle line "m" in the direction "n", that is decreasing the light extracting capacity.

In the case in which the light extracting capacity varies due to the size of said light extracting points (5.1), the light extracting points (5.1) can be sized over the flat side (4.3.2) of a lobed portion (4.3) in such a way that their size increases as they separate from the light source (6) in the direction "l", that is, increasing the light extracting capacity, and in such a way that their size decreases as they separate from the middle line "m" in the direction "n", that is decreasing the light extracting capacity.

Other option wherein different density and different size of the light extracting points (5.1) are combined has also been covered by the present invention.

On the other hand, the light extracting means (5) can comprises a roughness varying in the "l" and "n" directions according to the particular definition of the light extracting means (5) of the present invention.

In order to inject light inside the lobed portions (4.3), each lobed portion (4.3) comprises at least a light source (6) in correspondence with any of the edges (4.3.4) of each lobed portion (4.3).

Preferably, the light source (6) is a punctual light source such as a LED.

Several kind of LEDs can be used such as LED, RGB LED, or digital LED, digital RGB LED.

Each light source (6), and particularly each LED is powered by means of the circuit (8).

Said circuit (8) can comprise a strip to which several LEDs are connected as FIG. 1 shows, or can comprise an individual circuit for each LED.

The circuit (8) is connected to a processing means (not represented) in order to control the different light effects obtainable by the particular two-dimensional light guide (4) of the present invention.

In some embodiments the processing means are placed in a printed circuit board connected to the LEDs by the circuit (8), fully controlling every LED.

In other embodiments the processing means are divided into a main processing control which coordinates and synchronizes the whole LED assembly for obtaining the predefined light effects, and an auxiliary individual LED control for controlling LED colour, intensity, and switching.

As it has been discussed above, the particular two-dimensional light guide (4) of the present invention comprising lobed portions (4.3) in combination with its corresponding light source (6) allows obtaining multiple independent lighting areas having different colors at the same time.

According to this configuration it is also possible to obtain dynamic light effects by controlling independently each lobed portion (4.3) and particularly its corresponding light source (6).

Figure 7:
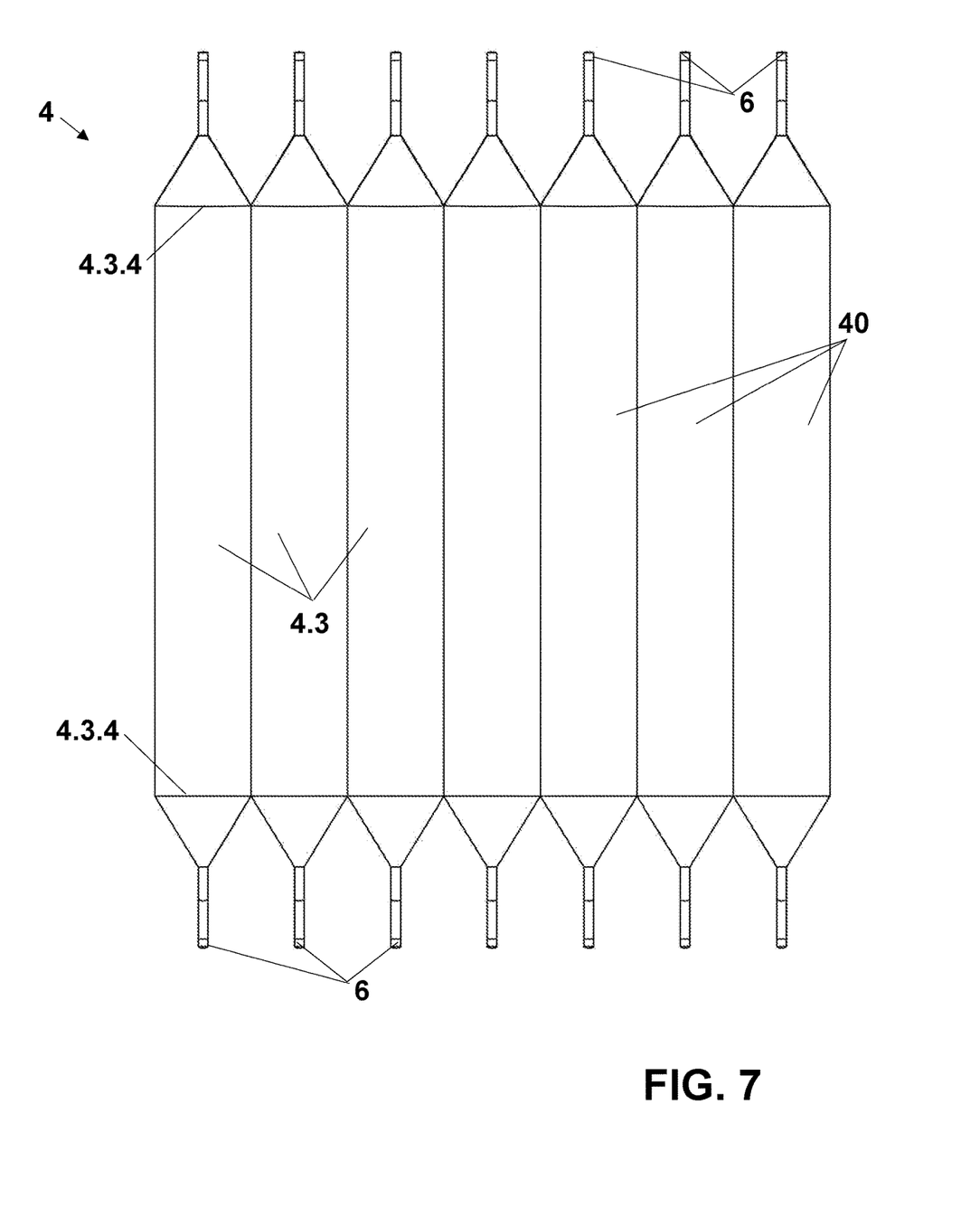
FIG. 7 shows a plan view of the two-dimensional light guide according to a second embodiment of the invention.
Figure 8:
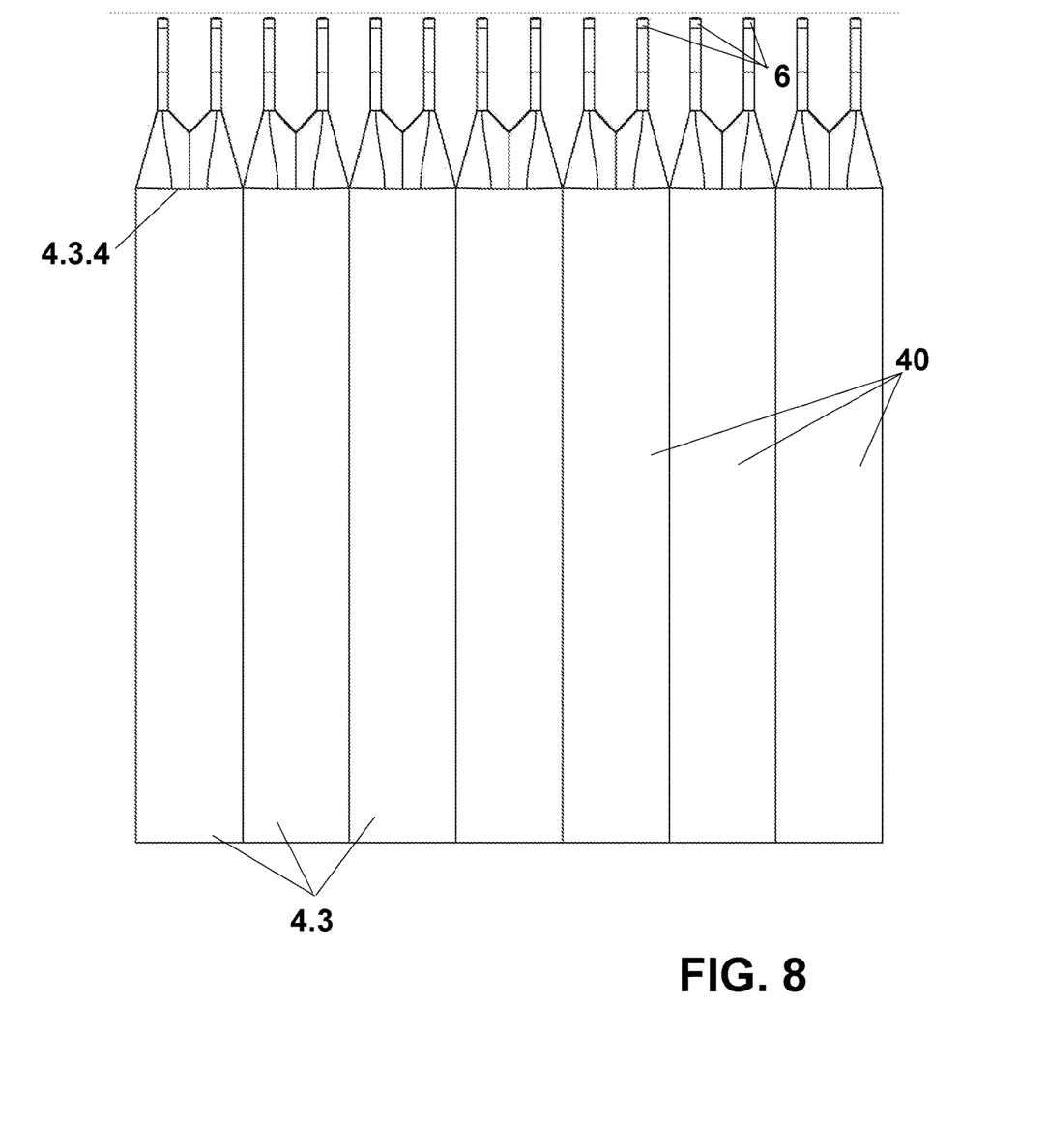
FIG. 8 shows a plan view of the two-dimensional light guide according to a third embodiment of the invention.
Figure 9:
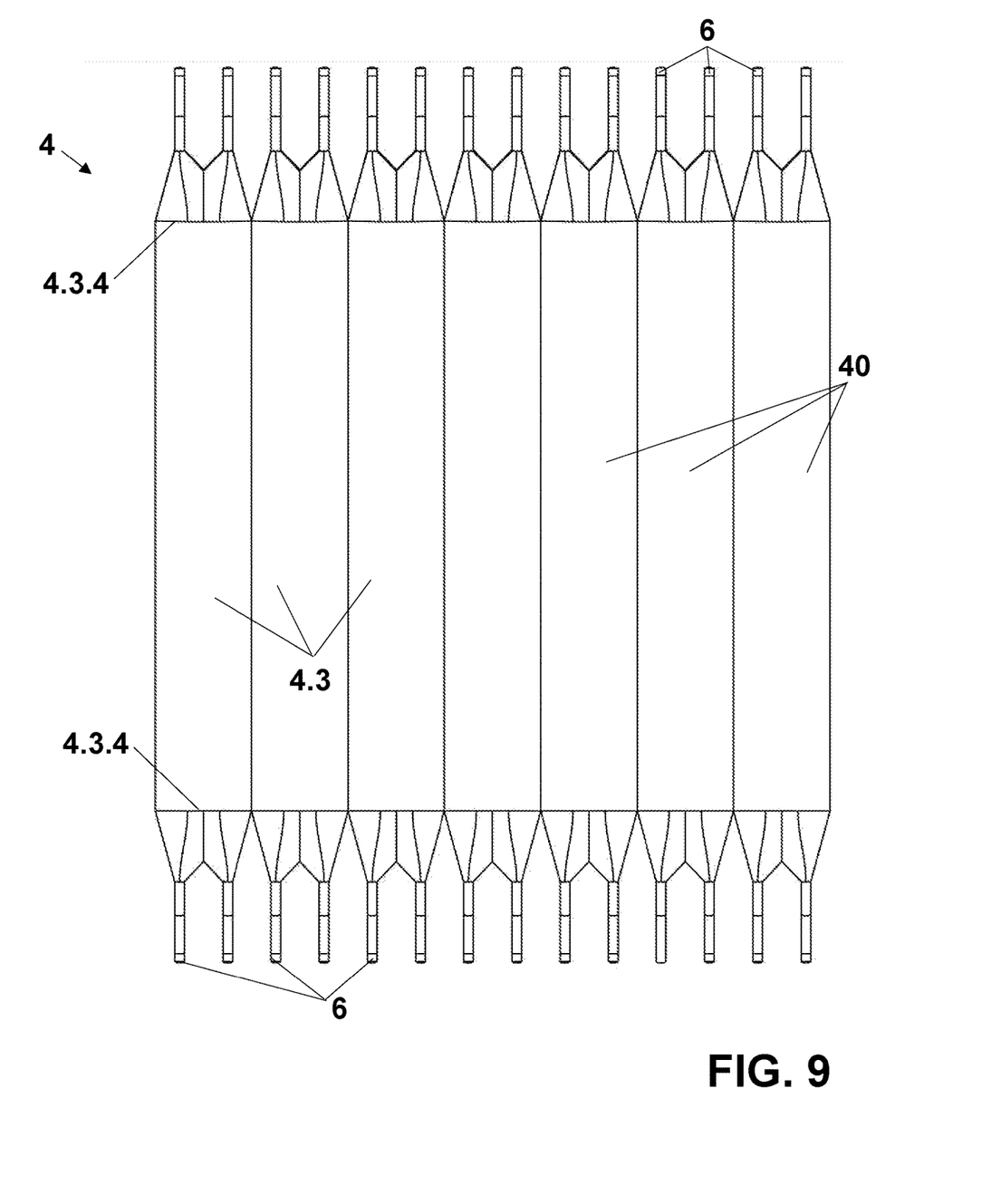
FIG. 9 shows a plan view of the two-dimensional light guide according to a forth embodiment of the invention.

Depending on the size of the backlit interior trim panel (1) and particularly the translucent backlit area (20) to be illuminated and the intensity of the light to be obtained in said translucent backlit area (20), each lobed portion (4.3) can comprise several light sources (6) optically coupled to its edges (4.3.4) as the embodiments represented in FIGS. 7 to 9 show.

Particularly the embodiment represented in FIG. 8 shows a two-dimensional light guide (4) having each lobed portion (4.3) two light sources (6) optically coupled to one of its edges (4.3.4).

The embodiment represented in FIG. 9 shows a two-dimensional light guide (4) having each lobed portion (4.3) two light sources (6) optically coupled to both edges (4.3.4).

The embodiment represented in FIG. 7 shows a two-dimensional light guide (4) having each lobed portion (4.3) two light sources (6) optically coupled, a first light source (6) coupled to one of its edges (4.3.4) and a second light source coupled to the other edge (4.3.4).

In said particular embodiment, each light source (6) coupled to one of the edges (4.3.4) of a lobed portion (4.3) is aligned with the corresponding light source (6) coupled to the opposite edge (4.3.4) of said particular lobed portion (4.3).

According to a case in which the two-dimensional light guide (4) is formed by lobed portions (4.3) having a divergent configuration alternated with lobed portions (4.3) having a convergent configuration, the light sources (6) can be arranged according to an alternate way, that is, one light source (6) is coupled to a first lobed portion (4.3) at one of its edges (4.3.4), and other light source (6) is coupled to a contiguous second lobed portion (4.3) at one of its edge being opposite to the edge of the first lobed portion (4.3).

According to the invention, the light source (6) can be coupled directly to the edge (4.3.4) of the lobed portion (4.3) or can be coupled to said edge (4.3.4) by a light coupling portion (7), as FIG. 2 shows.

The function of the light coupling portion (7) is to improve the optical coupling between the light source (6) and the lobed portion (4.3). It is because the light coupling portion (7) allows to distribute uniformly the light emitted by the light source (6) at the edge (4.3.4) of the lobed portion (4.3).

In order to achieve this effect, the light coupling portion (7) comprises a first portion (7.1) having a triangular shape.

Additionally, the light coupling portion (7) can comprise a second portion (7.2) in order to mix the light received by the light source (6) before it enters into the first portion (7.1).

This configuration is particularly advantageous when the light source (6) comprises a RGB LED or a digital RGB LED, emitting light of different colours which is necessary to mix before it enters into the lobed portion (4.3).

In order to achieve this effect, the second portion (7.2) preferably comprises a tubular portion having a cross section circular-shaped capable of mixing homogeneously the light emitted by the light source (6) in such a way the light received by the lobed portion (4.3) has an only colour.

The light coupling portion (7) can be aligned with the lobed portion (4.3), and particularly with the direction "l", or can have a curved configuration regarding the lobed portion (4.3) as FIG. 1 shows. Said configuration will depend on the shape of the backlit interior trim panel (1) and/or the available space to assembly said backlit interior trim panel (1) in the vehicle bodywork.

The invention claimed is:

1. Backlit interior trim panel (1) for vehicle interior comprising:
  a decorative cover (2) having a translucent backlit area (20) having a front decorative side (2.1) facing the vehicle interior and a back side (2.2) opposite to the front decorative side,
  a supporting component (3),
  a two-dimensional light guide (4) comprising multiple independent lighting areas (40), wherein said two-dimensional light guide (4) is placed between the decorative cover (2) and the supporting component (3), wherein the two-dimensional light guide (4) comprises:
  a back light extracting surface (4.2),
  a front light emission surface (4.1) configured to emit light to the back side (2.2) of the decorative cover (2) in correspondence with the translucent backlit area (20),
  a plurality of lobed portions (4.3), wherein each lobed portion (4.3) extends longitudinally in a direction (1), wherein each lobed portion (4.3) comprises a curved surface (4.3.1) in correspondence with the front light emission surface (4.1) of the two-dimensional light guide (4), a flat surface (4.3.2) in correspondence with the back light extracting surface (4.2) of the two-dimensional light guide (4), two side surfaces (4.3.3), and two edges (4.3.4) defined at the ends of each lobed portion (4.3),
    wherein the flat surface (4.3.2) of each lobed portion (4.3) defines a middle line (m) extending in the direction (l) and being between its both side surfaces (4.3.3),
    wherein each lobed portion (4.3) comprises a variable thickness between its flat surface (4.3.2) and its curved surface (4.3.1) in a direction n perpendicular to the direction (l), in such a way that each lobed portion (4.3) has a minimum thickness $e_{min}$, along its side surfaces (4.3.3) and a maximum thickness $e_{max}$ along the middle line (m),
    wherein the lobed portions (4.3) are physically connected one another by its side surfaces (4.3.3),
    wherein the lobed portions (4.3) are optically separated between them,
    wherein each lobed portion (4.3) comprises a light source (6) configured to inject light inside said lobed portion (4.3) and wherein said light source (6) is in correspondence with any of its edges (4.3.4),
  characterized in that,
    each flat surface (4.3.2) comprises light extracting means (5) having a light extracting capacity increasing progressively as said extracting means (5) are separated from the light source (6) in the direction (l), and having a light extracting capacity decreasing progressively as said extracting means are separated from the middle line (m) in the direction (n), in such a way that each lobed portion (4.3) defines an independent lighting area (40) configured to emit homogenous light from its curved surface (4.3.1) over its whole surface, and in such a way that when two contiguous lobed portions (4.3) emit light having the same lighting parameters from their curved sides (4.3.1) and at the same time, said light emitted is substantially homogenous across an optical separation between said contiguous lobed portions (4.3).

2. Backlit interior trim panel (1) for vehicle interior according to claim 1 wherein each light source (6) is optically coupled to its corresponding lobed portion (4.3) by a light coupling portion (7).

3. Backlit interior trim panel (1) for vehicle interior according to claim 2 wherein the light coupling portion (7) has a first portion (7.1) configured to distribute uniformly the light emitted by the light source (6).

4. Backlit interior trim panel (1) for vehicle interior according to claim 3 wherein the light coupling portion (7) has a second portion (7.2) configured to mix the light emitted by the light source (6).

5. Backlit interior trim panel for vehicle interior according to claim 4 wherein the second portion (7.2) comprises a tubular portion having a circular-shaped cross section.

6. Backlit interior trim panel (1) for vehicle interior according to claim 1 wherein each lobed portion (4.3) comprises several light sources (6).

7. Backlit interior trim panel for vehicle interior according to claim 6 wherein the light sources (6) are distributed at one of the edges (4.3.4) of the lobed portion (4.3).

8. Backlit interior trim panel for vehicle interior according to claim 6 wherein the light sources (6) are distributed at the two edges (4.3.4) of the lobed portion (4.3).

9. Backlit interior trim panel (1) for vehicle interior according to claim 1 wherein the light extracting means (5) are formed by a number of light extracting points (5.1).

10. Backlit interior trim panel for vehicle interior according to claim 1 wherein the light extracting capacity of the light extracting means (5) is variable due to the density of the light extracting means (5).

11. Backlit interior trim panel for vehicle interior according to claim 9 wherein the light extracting capacity of the light extracting means (5) is variable due to the density of the light extracting points (5.1).

12. Backlit interior trim panel for vehicle interior according to claim 1 wherein the light extracting capacity of the light extracting means (5) is variable due to the size of the light extracting means (5).

13. Backlit interior trim panel for vehicle interior according to claim 9 wherein the light extracting capacity of the light extracting means (5) is variable due to the size of the light extracting points (5.1).

* * * * *